United States Patent [19]

Howard

[11] Patent Number: 4,834,997

[45] Date of Patent: May 30, 1989

[54] METHOD OF PRESERVING FOODSTUFFS

[75] Inventor: John G. Howard, Norfolk, England

[73] Assignee: Vetostar Limited, Norfolk, United Kingdom

[21] Appl. No.: 130,235

[22] PCT Filed: Apr. 3, 1987

[86] PCT No.: PCT/GB87/00234

§ 371 Date: Dec. 3, 1987

§ 102(e) Date: Dec. 3, 1987

[87] PCT Pub. No.: WO87/05782

PCT Pub. Date: Oct. 8, 1987

[30] Foreign Application Priority Data

Apr. 4, 1986 [GB] United Kingdom ............... 8608247
Oct. 28, 1986 [GB] United Kingdom ............... 8625759

[51] Int. Cl.$^4$ ........................................ A23B 7/152
[52] U.S. Cl. .................................. 426/316; 426/319; 426/320
[58] Field of Search ................... 426/319, 316, 320

[56] References Cited

U.S. PATENT DOCUMENTS 3,975,551 8/1976 Shatila .
4,454,945 6/1984 Jabarin et al. ..................... 426/316

FOREIGN PATENT DOCUMENTS 0385775 5/1908 France .
1136525 5/1957 France .

Primary Examiner—Donald E. Czaja
Assistant Examiner—Helen Pratt
Attorney, Agent, or Firm—Scrivener and Clarke

[57] ABSTRACT

A method of extending the shelf life of foodstuffs comprises the steps of evacuating gas from the foodstuff and treating the foodstuff with carbon dioxide and sulphur dioxide either in admixture or sequentially. The gases are then evacuated from the foodstuff, which is sealed into a container under an inert gas. In cases where the preserved foodstuff is likely to exude moisture during storage, water may be removed from the product. Foodstuffs treatable by the method include fruit such as apples.

7 Claims, No Drawings

METHOD OF PRESERVING FOODSTUFFS

The present invention relates to a method of treatment of foodstuffs, particularly, but not exclusively, fruit such as apples, to prolong their shelf life. The process will be described with reference to apples, although it may be applied to other fruits.

The use of sulphur dioxide as a preservative for apple pulp to be used in manufacture is a long established and well known and documented practice. The addition of sulphur dioxide to apples at the rate of 350 mg/liter is permitted by the Preservative in Foods Regulations. At that level, thought necessary to preserve the apple pulp, the apple has a characteristic smell and flavour of sulphur dioxide and is, therefore, unsuitable for eating without further cooking and consequent softening to drive it away.

However, it is desired to preserve peeled apples in segments, slices or dice for storage at room temperature for several months. The apples should retain the crisp crunchy texture associated with fresh apples throughout that storage period. It has been found that this may be achieved by ensuring penetration of sulphur dioxide into the cell structure. The process uses much lower levels of sulphur dioxide than the established method, and therefore the product is acceptable without further cooking, thus retaining the firm texture of a raw apple.

Accordingly, the invention provides a method of extending the shelf life of foodstuffs which comprises the steps of evacuating gas from the foodstuff, treating the foodstuff with carbon dioxide and sulphur dioxide either in admixture or sequentially, evacuating said gases from the foodstuff and sealing the foodstuff into a container under an inert gas.

In cases where the preserved foodstuff is likely to exude moisture during storage, the method comprises an additional step of removing water from the product.

In the case of apples or eggs the additional step preferably comprises the step of blowing cold or ambient air over the foodstuff, after having treated the foodstuff with the gases. The amount of moisture removed in this manner may be in the region of 10% to 25% by weight of the total weight of foodstuff.

In the case of foodstuffs for human consumption, and particularly delicately flavoured foodstuffs such as apples, the amount of sulphur dioxide after processing, is for example a maximum of 250 mg/liter.

One danger in preservation methods of the present type is the development of the bacteria *Clostridium botulinum* which is a major pathogenic bacteria as regards humans and can prove fatal. Of course, it is advisable to minimise the danger of this bacteria developing and accordingly, the amount of sulphur dioxide preferably used is somewhat in excess of that needed for normal preservation techniques. In the case of apples, the acidity of the preserved product should ensure that the bacteria does not develop.

The container into which the foodstuff is sealed is preferably a tray, although other containers such as pouches may be used. The preferred material is a laminated plastics material with high barrier properties to oxygen, for example nylon/polyethylene.

The gas treatment step may be performed by admitting sulphur dioxide to an evacuated chamber containing the foodstuff, measuring the pressure difference to determine the level of sulphur dioxide, and then admitting carbon dioxide until atmospheric pressure is reached.

Alternatively, the sulphur dioxide and carbon dioxide may be mixed beforehand and the mixture admitted to the chamber.

The method may comprise an additional step, after evacuating said sulphur and carbon dioxides from the foodstuff, of flushing the foodstuff with carbon dioxide.

The invention will now be more particularly described with reference to the following non-limiting Examples.

EXAMPLE 1

Preservation of raw apples

This Example was carried out twice, once with Bramley cooking apples and once with Granny Smith eating apples (chosen because of their firm texture). In each case the results were comparable.

The process included the following steps:
1. The apples were peeled and segmented.
2. The segments were put in water as peeled to prevent oxidation. Immediately before treatment the apples were drained and put in trays.
3. The trays of apples were placed in a vacuum/pressure vessel, which was closed.
4. The vessel was totally evacuated and the vacuum held for 5 minutes.
5. The vacuum was dropped to 20 mm Hg by admitting carbon dioxide.
6. The vacuum was further dropped to 18 mm Hg by admitting sulphur dioxide.
7. The vacuum was released to 0 mm Hg by admitting carbon dioxide.
8. The vessel was again evacuated to 30 mm Hg and the condition held for 10 minutes.
9. The vessel was flushed with carbon dioxide to a pressure of 0.5 bar and maintained for 2 minutes.
10. Air was admitted, the vessel opened and apples were removed.
11. The apples were spread on a metal grid and air at ambient temperature was blown through the apple until the weight of apple was reduced by 18%. This took 1½ hours on the apparatus used (a laboratory scale drier).
12. A pad of absorbent material capable of absorbing 6% of the apple weight was placed in the bottom of a rigid tray of nylon/polyethylene and the tray was then filled with apple segments.
13. The air was evacuated from the tray on a vacuum sealer, carbon dioxide was flushed into the tray and a clear laminate lid of nylon/polyethylene heat sealed on top of tray to produce a hermetic seal.
14. Apples analysed immediately after packing were found to contain 180 mg/liter sulphur dioxide. After one month this had reduced to 80 mg/liter. The legal limit is 350 mg/liter.
15. Packs were opened at weekly intervals for 4 months and no deterioration was detected.

EXAMPLE 2

Preservation of raw apples

Example 1 was repeated, again with the two varieties of apple.

However, in step 11, the air treatment, the air was blown through the apples for 3½ hours (with the apparatus used) until the weight of apple was reduced by 24%.

In step 12, the pad of absorbent material was omitted since no exudation was expected.

The remaining steps were as in Example 1 and the results were similar.

In all the examples given above the correct level of sulphur dioxide was achieved by measuring pressure drop on the vacuum vessel, then completing the gas process by admitting carbon dioxide. Further experiments have shown that the same effect can be obtained by using a mixture of sulphur dioxide and carbon dioxide in proportions calculated to give the same volume of sulphur dioxide as in the Examples.

In the Examples, the preserved product was packaged in rigid plastic trays. Alternatively the products may be put in a pouch made of the same material and optionally the pouch put in a carton for protection.

I claim:

1. A method of extending the shelf life of fruit foodstuffs which comprises the steps of evacuating gas from the foodstuff; treating the foodstuff with carbon dioxide and sulphur dioxide either in admixture or sequentially while maintaining the pressure no higher than atmospheric pressure; evacuating said gases from the foodstuff; removing water from the product by blowing cold or ambient air over the foodstuff until the amount of water removed is in the region of 10–25% by weight of the total weight of foodstuff; and sealing the foodstuff into a container under an inert gas.

2. A method as claimed in claim 1, wherein the foodstuff is apples, and the maximum amount of sulphur dioxide after processing is 250 mg/liter.

3. A method as claimed in claim 1, wherein the container is a laminated plastics material with high barrier properties to oxygen.

4. A method as claimed in claim 1, wherein the gas treatment step is performed by admitting sulphur dioxide to an evacuated chamber containing the foodstuff, measuring the pressure difference to determine the level of sulphur dioxide, and then admitting carbon dioxide until atmospheric pressure is reached.

5. A method as claimed in claim 1 wherein the gas treatment step is performed by admitting to an evacuated chamber containing the foodstuff, the sulphur dioxide and carbon dioxide which have been mixed beforehand.

6. A method as claimed in claim 1 comprising the additional step, after evacuating said sulphur dioxide and carbon dioxide gases from the foodstuff, of flushing the foodstuff with carbon dioxide.

7. A method as claimed in claim 3, wherein the laminated plastics material is nylon/polyethylene.

* * * * *